United States Patent Office 3,833,527
Patented Sept. 3, 1974

3,833,527
HEMICELLULOSE REACTION PRODUCTS
Erkki J. Pulkkinen, Morris Plains, N.J., and Marten Reintjes and Laurence Dean Starr, Shelton, Wash., assignors to International Telephone and Telegraph Corporation, New York, N.Y.
No Drawing. Filed Dec. 18, 1972, Ser. No. 316,066
Int. Cl. C08b 25/00, 29/00
U.S. Cl. 260—9
17 Claims

ABSTRACT OF THE DISCLOSURE

Water soluble products are prepared from hemicelluloses by reacting them in an alkaline medium with epichlorohydrin and an alkanolamine or with an adduct of epichlorohydrin and a tertiary amine or its salt. The hemicelluloses which are used have an average degree of polymerization no greater than 400. The products while still in an alkaline state or neutralized if desired are useful as adhesives forming strong, water soluble, non-hygroscopic adhesives upon drying. The water soluble products upon protonation with a mineral acid form effective flocculants for aqueous suspensions and can be dried to colorless, non-hygroscopic powders. The hemicelluloses are extracted from vegetable matter such as wood or separated from pulp bleaching and refining effluents by known methods and, depending upon their composition, can be advantageously pretreated to increase their solubility and reactivity in aqueous and alkaline solutions.

---

This invention relates to water soluble reaction products of hemicelluloses, to a process for their preparation and to flocculants and adhesives prepared therefrom.

The effluent streams from pulp mill bleaching and refining operations contain large quantitities of hemicelluloses for which a satisfactory and profitable method of disposal has long been sought. While hemicelluloses, like celluloses, are polysaccharides found in wood and other plant materials they differ from celluloses in many ways. Celluloses are normally fibrous and at least partially crystalline. Hemicelluloses are non-fibrous and essentially amorphous. Chemically and structurally speaking, both hardwood and softwood celluloses are long-chain polymers of predominantly anhydroglucose monomer units with a number of average degree of polymerization (DP) in the native state of about 3,000 to 5,000. Softwood and hardwood hemicelluloses are relatively short-chain polymers of predominantly mannose and xylose monomer units with a DP of about 200 to 400 in the native state. Pulping and refining of the vegetative material reduces the DP of the cellulose to about 1500 to 2000 and for the hemicelluloses in effluent streams to about 20 to 100 respectively. Solubility and reactivity characteristics of celluloses and hemicelluloses differ widely. Since presently hemicelluloses are essentially waste products, it is desirable to convert them into useful products, not only because of the economic advantage of doing so but also from an ecological standpoint by eliminating a troublesome disposal problem.

It has been discovered that the foregoing hemicelluloses may be reacted in alkaline medium with epichlorohydrin and an alkanolamine or with adducts of epichlorohydrin and a tertiary amine or its salt to form water-soluble products. These products, when in the alkaline or neutral stage, are useful water-soluble adhesives. It has further been discovered that the aforesaid water-soluble products can be protonated to form colorless, effective flocculating agents. It has also been discovered that hemicelluloses derived from softwoods which normally contain substantial amounts of mannose can have their water and alkali solubility increased by a pretreatment to increase their utility, such as by either hydroxyalkylation or carboxyalkylation, with or without the use of borates.

In practice the process is varied according to the composition of the hemicelluloses and the desired end product. The hemicelluloses, treated to increase solubility if desired, are suspended in an excess of a 10 to 30% aqueous sodium hydroxide solution at room temperature or below. A slight excess of an alkanolamine, based on the anhydro sugar units in the hemicelluloses, is slowly stirred into the solution. A slight excess of epichlorohydrin is then slowly stirred into this mixture and the mixing continued until the reaction is complete, which takes from about one to four hours. During the reaction the temperature is maintained below 75° C. and preferably between about 50 and 60° C. using external cooling as needed since the reaction is exothermic. Alternatively, instead of adding the epichlorohydrin and alkanolamine separately to the alkaline hemicellulose solution, epichlorohydrin and a tertiary amine or its salt can be combined into an adduct and the adduct added to the hemicellulosic solution in a similar manner. Particularly effective adducts are 3-chloro-2-hydroxypropyltrimethylammonium chloride and glycidyltrimethylammonium chloride prepared by combining substantially equimolar solutions of epichlorohydrin and trimethylamine hydrochloride and epichlorohydrin and trimethylamine, respectively.

The next step depends upon the desired end product. In order to provide a flocculating agent, the alkaline product solution prepared as indicated above, with or without removal of inorganics as by dialysis, is protonated to a pH of from 1 to 6. The acidified product that results is an extremely effective cationic flocculant for clarifying aqueous suspensions. The flocculant solution can also be dried to yield a colorless, non-hygroscopic powder for shipment and storage if desired.

In order to provide an adhesive, the alkaline product solution can be taken as is or, alternatively, neutralized and purified as by dialysis and then concentrated to the desired consistency, whereupon it is ready for use as a water-soluble adhesive. A particularly effective adhesive is formed when the alkaline product solution is prepared by the reaction of an alkaline hemicellulose solution with the adduct of epichlorohydrin and trimethylamine hydrochloride, i.e., with 3-chloro-2-hydroxypropyltrimethylammonium chloride.

Suitable examples of alkanolamines are ethanolamine, diethanolamine and diethylaminoethanol. Tertiary amines which are useful are, for example, trimethylamine, triethylamine, dimethyl benzylamine, N-methyl pyrrolidine, N-methyl morpholine and other alkyl or aralkyl tertiary amines and their hydrochloride salts.

Softwood hemicelluloses contain substantial proportions of mannose units and are less water and alkali soluble and accordingly less reactive than hardwood hemicelluloses which are composed predominantly of xylose units. It is therefore desirable in many cases that softwood hemicelluloses be pretreated chemically in order to optimize their utilization. This may be done by etherification, either with a carboxyalkylating or an hydroxyalkylating agent. Suitable carboxyalkylating agents are short chain (up to 5 carbon atom) halogenated carboxylic acids such as chloroacetic or chloropropionic acid. Hydroxyalkylation may be accomplished with an alkylene oxide such as ethylene or propylene oxide. The etherification may be effected with or without the addition of borates.

The reaction conditions for pretreatment will vary according to the method used. In the case of carboxymethylation the hemicelluloses are suspended in an alkaline medium such as a sodium hydroxide solution having a concentration of from about 1 to 20% and preferably about 5 to 10% sodium hydroxide by weight at a temperature of from about 5 to 15° C. and preferably about 10° C. Chloroacetic acid is then slowly added with agitation. The reaction being exothermic, the temperature will rise and should be kept below 75° C. with external cooling if necessary and preferably about 60° C. Above 75° C., the hemicellulose itself is degraded and below about 50° C. becomes too slow to be practical. The range of chloroacetic acid to hemicelluloses should be from about 1:3 to about 1:8 and preferably about 1:6. For example, the concentration of chloroacetic acid preferably would be about 0.8% of the total reaction mixture when the concentration of the hemicellulose is 4.7%. The time of reaction will range from about three to ten hours, and preferably about five hours. Boric acid can be added to the reaction with chloroacetic acid in a ratio of about 1 to 1 to reinforce the solubilizing effect of the chloroacetic acid on the hemicellulose. Extra boric acid is not particularly detrimental but does not further contribute to the success of the reaction.

In the case of hydroxyethylation, the hemicellulose is reacted with ethylene oxide in the presence of an alkaline catalyst such as sodium hydroxide and a small amount of water to swell the hemicellulose. The reaction mixture can be diluted with inert or a slowly reacting solvent like isopropanol, t-butylalcohol or dioxane. Ethylene oxide also can be introduced into the moist alkaline hemicellulose through vapor phase preferably keeping the reactor under a slight vacuum. There should be enough alkali for the reaction to be completed in a reasonable time, for example, from a few minutes to 10 hours at a temperature below 75° C. and preferably below 50° C. An amount of NaOH ranging from 0.1 g. to 5 g. per one gram of hemicellulose should be sufficient. The amount of ethylene oxide should be so adjusted that, assuming a 50 percent hydroxyethylation efficiency, no more than 5 percent of ethylene oxide is introduced into the product; otherwise, the product will be difficult to purify.

The following examples will illustrate the practice of the invention. Unless otherwise indicated, all parts and percentages are by weight.

EXAMPLE 1

A hemicellulosic material essentially devoid of mannose was obtained by extracting a bleached kraft hardwood pulp (gumwood) several times with caustic solutions containing up to 15% NaOH, precipitating the hemicellulosic material from the extract solutions with methanol and washing and drying it. The dried hemicellulose had a standard cuene I.V. value of 0.77 to 0.87 and contained 57.8–62.9% xylans, 0.01 to 0.1% mannans, 0.1–0.2% glucans and up to about 9.7% uronic acids.

Samples comprising six to seven grams each of the foregoing hemicellulosic material were placed in Morton flasks and suspended in 100 ml. portions of 20% NaOH solution at room temperature. A 0.1 molar portion of ethanolamine, diethanolamine and dimethylaminoethanol respectively were added and the flask flushed with nitrogen. Epichlorohydrin (0.1 mole) was then slowly added to each flask with stirring and the reaction continued for from about one to four hours at from about 25 to 75° C. (The reaction being exothermic, the temperature rises by itself from about 5 to 25° C. within five to 15 minutes and is preferably held at about 60° C. during the reaction using external cooling if necessary.) Upon completion of the reaction, the flasks were cooled to 25 to 35° C. and acidified with 45 ml. of concentrated hydrochloric acid. (Up to this point the reaction in each case was carried out under an atmosphere of nitrogen.) The acidified product solutions were then dialyzed overnight and tested for flocculating ability.

The flocculating properties of the foregoing products were tested on freshly prepared aqueous kaolinite suspensions by means of the so-called "jar test" method as described by M. Lane in the September issue of Water and Sewage Works, page 404 for 1959. In this method, freshly prepared kaolinite suspensions are stirred at 100 r.p.m. while the flocculants are added. Stirring is continued for one minute at 100 r.p.m. and then for 20 minutes at 30 r.p.m. The suspensions are then allowed to settle for 30 minutes and the turbidities determined in Jackson Turbidity Units (JTU) and compared to turbidities run on said suspensions before adding the flocculants. The results are shown in Table I.

TABLE I

| Sample | Amine in flocculant | Dosage, p.p.m. | Initial turbidity | Final turbidity | Remaining turbidity, percent |
|---|---|---|---|---|---|
| 1 | Ethanolamine | 10 | 200 | 25 | 17 |
| 2 | do | 10 | 145 | 15 | 10 |
| 3 | Diethanolamine | 30 | 145 | 56 | 39 |
| 4 | Dimethylaminoethanol | 10 | 145 | 53 | 37 |
| 5 | Trimethylamine [1] | 4 | 140 | 11 | 8 |

[1] Introduced by reaction of hemicellulose with the adduct of trimethylamine and epichlorohydrin.

EXAMPLE 2

The cold caustic effluent produced during the refining of a southern pine kraft pulp normally contains about 1 to 2% hemicellulosic material, of which about 20 to 30% is a mixture of mannans. A large sample of such a cold caustic effluent was obtained from a mill in Georgia and the mannan-rich hemicelluloses were isolated therefrom by precipitation with three parts methanol to each part effluent. The precipitate was permitted to settle for one hour at ambient temperature and the clear supernatant liquid decanted off. The precipitate was gathered and centrifuged, washed twice in the centrifuge with water and then spun out again. This hemicellulosic material had the following analysis: xylose 31%, mannose 7.1%, glucose 22.9%, and uronic acids 1.3%.

Four 6 to 7 gram samples of the foregoing hemicellulosic material were placed in Morton flasks and reacted with the adduct of trimethylamine hydrochloride and epichlorohydrin (2 - hydroxy-3-chloropropyltrimethylammoniumchloride) by the same method as used in Example 1 and tested for their ability to flocculate fresh kaolinite solutions by the "jar test" method. The results are shown in Table II.

TABLE II

| Sample: | Dosage in p.p.m. | Initial turbidity | Final turbidity | Remaining turbidity, percent |
|---|---|---|---|---|
| 1 | 3 | 140 | 21 | 15 |
| 2 | 4 | 140 | 17 | 12 |
| 3 | 5 | 140 | 15 | 11 |
| 4 | 6 | 140 | 14 | 10 |

EXAMPLE 3

This example illustrates the increased proportion of water-soluble product obtained by carboxymethylating a softwood hemicellulose rich in mannans before converting it into a flocculating agent by reaction with epichlorohydrin and an alkanolamine. A large sample of cold caustic refining effluent was obtained from a mill producing southern pine bleached kraft pulp. The hemicellulosic material was precipitated therefrom with three volumes of methanol, dialyzed and freeze-dried to yield a buff-colored granular powder containing about 6.8% water.

Three 6 gram samples of this powdered hemicellulose (Samples A, B and C) were carboxymethylated by sprinkling them upon 100 ml. aliquots of 18.5% aqueous NaOH solution in Morton flasks at 10° C. One gram of chloroacetic acid was then added and the system flushed with nitrogen. A fourth sample (D) was carboxylated in the same manner except that a large sample was used, to wit: 50 grams of powdered hemicellulose, 500 mls. of 18.5% NaOH solution and 8.3 grams of chloroacetic acid. Reaction conditions were varied as follows:

(A) The reaction mixture was stirred for five hours at ambient temperature.
(B) The reaction mixture was stirred for five hours at 60° C. on a steam bath.
(C) Boric acid (1.00 gram) was added prior to adding the chloroacetic acid. The reaction mixture was then stirred for five hours at 60° C. on a steam bath.
(D) Boric acid (8.3 grams) was added to the mixture prior to adding the chloroacetic acid. The reaction mixture was stirred for five hours at 60° C. on a steam bath.

Following carboxymethylation, the foregoing products were recovered by precipitation with three volumes of methanol. Further separations in water-soluble and water-insoluble fractions were made by stirring the precipitates with 350 mls. of water heated to 50° C. Recovery of the water-soluble portions of this material was accomplished by precipitation with three volumes of methanol. Each of the products was then dried by solvent exchange (methanol, acetone, ether) and recovered as off-white powders. The yields are given in Table III.

TABLE III

| Sample: | Yield water insoluble product, grams | Yield water soluble product, grams | Total yield, grams | Theoretical yield, grams | Yield of water soluble product, percent total yield |
|---|---|---|---|---|---|
| (A) | 4.57 | 1.32 | 5.89 | 6.44 | 22.4 |
| (B) | 4.27 | 1.42 | 5.69 | 6.44 | 25.0 |
| (C) | 2.68 | 2.89 | 5.57 | 6.44 | 51.7 |
| (D) | 8.84 | 39.56 | 48.40 | 53.81 | 81.8 |

EXAMPLE 4

In this example, a 71% water soluble quaternary flocculant was prepared by reaction of hemicellulose with an adduct of epichlorohydrin and trimethylamine. A 500 ml. aliquot of caustic effluent produced during the refining of southern pine kraft pulp was extracted with an equal volume of isopropanol. A 50 ml. volume of the resulting water layer analyzing as 6.342 g. total solids and 2.71 g. Na corresponding to 4.72 g. NaOH was then evaporated to a small volume (few milliliters) and reacted in a 150 ml. Erlenmeyer flask with 5 ml. of epichlorohydrin-(ECH)-trimethylamine (TMA) reagent by stirring the mixture magnetically in a 50° oil bath for 2 hours. The ECH-TMA reagent was prepared by combining equal molar amounts of epichorohydrin and trimethylamine (as a 25% aqueous solution) and mixing at room temperature until the ECH disappeared as a separate phase. The product was isolated from the reaction mixture by precipitating with methanol (150 ml.), made acidic with acetic acid and washed with methanol (80 ml.) followed by centrifuging. After drying for 3 hours at 50° C. in a vacuum oven, the product weighed 1.36 g., had a N content 0.2% and was 71% water soluble.

EXAMPLE 5

This example illustrates how pretreatment of hemicellulose, prior to the reaction with the quaternization agent, can markedly improve the water solubility and flocculation ability of the resulting cationic partially hydroxyethylated hemicellulose in comparison to the cationic derivative from non-hydroxyethylated hemicellulose. The same charge of hemicellulose-NaOH concentrate as in Example 4 was mixed with 2.5 ml. ethylene oxide at room temperature for 17 hours. The partially hydroxyethylated hemicellulose was then precipitated from the reaction mixture with methanol, centrifuged and washed with 50 ml. of isopropanol, rinsed with 3 ml. of isopropanol into a 150 ml. Erlenmeyer flask and reacted as in Example 4 with 5 ml. of the ECH-TMA reagent at 50° C. for 3 hours, 35 minutes. The product isolated as in Example 4, weighed 1.63 g., had N content 0.3%, ethylene oxide content 3.8% and was 92.7% water soluble.

EXAMPLE 6

A filtration method was employed in evaluation of flocculation activities of the quaternary ammonium products derived from hemicellulose (Example 4) and from partially hydroxyethylated hemicellulose (Example 5). This method compares the times (in seconds) required to collect 45 ml. aliquots from a 50 ml. flocculated bentonite (400 p.p.m.) dispersion, said flocculated dispersions being introduced into a filtering holder equipped with a 47 mm. wide Millipore filter having a mean pore size of 0.3 micron and filtered at constant 10 p.s.i.g. pressure.

TABLE IV

| Sample | Dosage, p.p.m. | Filter time, seconds |
|---|---|---|
| Cationic hemicellulose from Example 4 | 0 | 537 |
|  | 50 | 193 |
|  | 100 | 97 |
| Cationic HE-hemicellulose from Example 5 | 0 | 537 |
|  | 10 | 185 |
|  | 30 | 144 |
|  | 50 | 143 |
|  | 75 | 149 |

The results show an optimum dosage for cationic hemicellulose and for cationic hydroxyethylated hemicellulose at about 100 and 30 p.p.m. respectively.

EXAMPLE 7

This example illustrates that the never dried hemicellulose, precipitated from the caustic effluent produced during the kraft pulping of southern pine, can be carboxymethylated to a high degree of substitution (D.S. above 0.5) and to high water solubility if a sufficient excess of chloroacetic acid to the hemicellulose is employed. One liter of the same hemi caustic effluent as used in Examples 4–7 was diluted with 3 liters of methanol to precipitate the hemicellulose. The liquid was then decanted off and the precipitate centrifuged and washed by centrifuging with ethyl alcohol. Some of the excess solvent was evaporated from the precipitate which then weighed 81.6 g. and contained 14.8% solids. Hemicellulose 11.3 g. (0.07 mole) in 56 g. ethyl alcohol and 11.3 g. NaOH dissolved in 45 g. $H_2O$ were placed in a 250 ml. Erlenmeyer flask and mixed well before 11.3 g. (0.098 mole) of the sodium salt of chloroacetic acid was introduced. The flask, equipped with an air condenser (a glass tube) and a magnetic stirring bar, was then inserted into a constant temperature bath where the contents were stirred magnetically for 4 hours at 60° C. Upon cooling, 40 ml. of water was added. The carboxymethylated hemicellulose was precipitated out with 350 ml. ethanol and washed free of salts with a mixture of methanol and water (80-20 by volume). To remove the sparingly soluble $Na_2CO_3$ the product was washed in water, made acidic with 3N HCl, mixed well to remove $CO_2$ and made alkaline with 2N NaOH. The carboxymethylated (CM) hemicellulose was precipitated again with methanol, washed free of salt and washed on the filter with 50 ml. ethanol. Yield: 10 g. of ethanol moist CM-hemicellulose containing 7.2 g. CM-hemicellulose (D.S. 0.32); water insolubles 13.6%. A subsequent carboxymethylation yielded a completely water soluble product of D.S. 0.54.

EXAMPLE 8

This example illustrates the formation of a water-soluble adhesive from hemicellulosic materials. A xylan fraction obtained from a gumwood kraft pulp was dissolved in 20% aqueous sodium hydroxide which amounted to 1500% (v./w.) of the hemicellulose weight. The system was flushed with nitrogen and a 63% aqueous solution of 2-hydroxy-3-chloropropyltrimethylammonium chloride, amounting to 284% of the hemicellulose weight (v./w.), (solids basis) was added at 25° C. over 5 minutes. The mixture was now heated to 50° C. and stirred at that temperature for one hour. After cooling to room temperature, the mixture was neutralized with concentrated hydrochloric acid and dialyzed for 60 hours to give a clear yellow solution, having a pH of 8. Evaporation of this material on glass left a brittle, tough film. Attempted removal from the glass also removed some of the glass as well as the film.

We claim:

1. The water soluble product of reaction in an alkaline medium at a temperature of below 75° C. of hemicellulose and reactants selected from the group consisting of epichlorohydrin and an alkanolamine, an adduct of epichlorohydrin and a tertiary amine and an adduct of epichlorohydrin and a tertiary amine salt, said hemicellulose having an average degree of polymerization no greater than 400.

2. The water soluble product of reaction of Claim 1 in which the reactant is an adduct of epichlorohydrin and a tertiary amine.

3. The water soluble product of reaction of Claim 1 in which the reactant is an adduct of epichlorohydrin and a tertiary amine salt.

4. The water soluble product of reaction of Claim 1 in which the reactants are epichlorohydrin and an alkanolamine.

5. The water soluble product of reaction of Claim 2, in which the adduct is glycidyltrimethylammonium chloride.

6. The water soluble product of reaction of Claim 3 in which the adduct is 3-chloro-2-hydroxypropyltrimethylammonium chloride.

7. A flocculating agent formed from the protonated water soluble product of reaction of Claim 1.

8. A water soluble adhesive of the product of reaction of Claim 1.

9. The water soluble product of reaction of Claim 1, in which the hemicellulose is derived from hardwood.

10. The water soluble product of reaction of Claim 2, in which the hemicellulose is derived from softwood.

11. The water soluble product of reaction of Claim 10, in which the hemicellulose has been pretreated by hydroxyalkylation.

12. The water soluble product of reaction of Claim 10, in which the hemicellulose has been pretreated by carboxyalkylation.

13. A process of preparing a water soluble product comprising reacting in an alkaline medium at a temperature of below 75° C. hemicellulose, having an average degree of polymerization no greater than 400, with reactants selected from the group consisting of epichlorohydrin and an alkanolamine, an adduct of epichlorohydrin and a tertiary amine and an adduct of epichlorohydrin and a tertiary amine salt.

14. The process of Claim 13 in which the reaction product is protonated with a mineral acid to form a flocculating agent.

15. The process of Claim 13 in which the hemicellulose is derived from softwood.

16. The process of Claim 15 in which the hemicellulose is pretreated by hydroxyalkylation with ethylene oxide in an alkaline catalyst.

17. The process of Claim 15 in which the hemicellulose is pretreated by carboxyalkylation with chloroacetic acid in the presence of an alkaline catalyst.

References Cited

UNITED STATES PATENTS

| | | | |
|---|---|---|---|
| 2,120,513 | 6/1938 | Stahn | 260—212 |
| 3,102,112 | 8/1963 | Carter et al. | 260—212 |
| 2,580,491 | 1/1952 | Ward et al. | 260—212 |

WILLIAM H. SHORT, Primary Examiner

E. WOODBERRY, Assistant Examiner

U.S. Cl. X.R.

210—54; 260—209 R, 212